(12) United States Patent
Hibbs (10) Patent No.: US 12,140,608 B2
(45) Date of Patent: Nov. 12, 2024

(54) SYSTEMS AND METHODS FOR STARTING A SENSORLESS MOTOR

(71) Applicant: AEROVIRONMENT, INC., Arlington, VA (US)

(72) Inventor: Bart Dean Hibbs, Simi Valley, CA (US)

(73) Assignee: AEROVIRONMENT, INC., Arlington, VA (US)

( * ) Notice: Subject to any disclaimer, the term of this patent is extended or adjusted under 35 U.S.C. 154(b) by 93 days.

(21) Appl. No.: 17/783,486

(22) PCT Filed: Dec. 7, 2020

(86) PCT No.: PCT/US2020/063611
§ 371 (c)(1),
(2) Date: Jun. 8, 2022

(87) PCT Pub. No.: WO2021/118928
PCT Pub. Date: Jun. 17, 2021

(65) Prior Publication Data
US 2023/0017339 A1 Jan. 19, 2023

Related U.S. Application Data

(60) Provisional application No. 62/945,813, filed on Dec. 9, 2019.

(51) Int. Cl.
*G01P 3/48* (2006.01)
*B64C 39/02* (2023.01)
(Continued)

(52) U.S. Cl.
CPC .............. *G01P 3/48* (2013.01); *B64C 39/024* (2013.01); *B64U 10/25* (2023.01); *B64U 30/10* (2023.01);
(Continued)

(58) Field of Classification Search
CPC ....... B64C 39/02; B64C 39/024; G01P 13/04; G01P 3/48; G01P 13/045; H02P 6/182;
(Continued)

(56) References Cited

U.S. PATENT DOCUMENTS

| 5,811,946 A * | 9/1998 | Mullin ................ H02P 7/2805 388/811 |
| 5,929,576 A | 7/1999 | Yasohara et al. |
| 2002/0185986 A1 | 12/2002 | Seki |
| 2007/0001635 A1 | 1/2007 | Ho |

(Continued)

FOREIGN PATENT DOCUMENTS

| CN | 104779853 A | 7/2015 | |
| EP | 2104222 A1 * | 9/2009 | .............. H02P 25/03 |

(Continued)

OTHER PUBLICATIONS

Lee et al. "Newly proposed hybrid type mutli-DOF operation motor for multi-copter UAV systems", IEEE Energy Conversion Congress and Exposition (ECCE), 2015. [Retrieved on Feb. 8, 2021]. Retrieved from <URL: https://ieeexplore.ieee.org/abstracUdocument/7310050> entire document.

(Continued)

*Primary Examiner* — Alexander Satanovsky
*Assistant Examiner* — Courtney G McDonnough
(74) *Attorney, Agent, or Firm* — Concept IP LLP; Pejman Yedidsion; Eric Aagaard (57) ABSTRACT

Systems, devices, and methods for: an unmanned aerial vehicle (UAV); at least one sensorless motor of the UAV, the at least one sensorless motor comprising a set of windings and a rotor; at least one propeller connected to the at least one sensorless motor; a microcontroller in communication with the at least one sensorless motor, wherein the microcontroller is configured to: determine a rotation rate of the at least one propeller; determine a rotation direction of the at least one propeller; provide an output to stop the at least one (Continued)

propeller if at least one of: the determined rotation rate is not a desired rotation rate and the determined rotation direction is not a desired rotation direction; and provide an output to start the at least one propeller if the at least one propeller is stopped at the desired rotation rate and the desired rotation direction.

17 Claims, 8 Drawing Sheets

(51) Int. Cl.
| | |
|---|---|
| *B64U 10/25* | (2023.01) |
| *B64U 30/10* | (2023.01) |
| *B64U 30/20* | (2023.01) |
| *B64U 50/13* | (2023.01) |
| *B64U 50/19* | (2023.01) |
| *G01P 13/04* | (2006.01) |
| *H02P 6/182* | (2016.01) |
| *H02P 6/20* | (2016.01) |

(52) U.S. Cl.
CPC .............. *B64U 50/13* (2023.01); *B64U 50/19* (2023.01); *G01P 13/045* (2013.01); *H02P 6/182* (2013.01); *H02P 6/20* (2013.01); *B64U 30/20* (2023.01)

(58) Field of Classification Search
CPC .............. H02P 6/20; B64D 1/18; B64D 31/06; B64U 10/25; B64U 30/10; B64U 50/13; B64U 50/19; B64U 2201/20; B64U 30/20
USPC .......................................................... 324/166
See application file for complete search history.

(56) References Cited

U.S. PATENT DOCUMENTS

| | | | |
|---|---|---|---|
| 2010/0019707 A1* | 1/2010 | Dooley | H02P 6/22 318/400.11 |
| 2014/0324236 A1* | 10/2014 | Bankestrom | F03D 7/00 700/287 |
| 2015/0061440 A1 | 3/2015 | Catalan | |
| 2015/0232181 A1* | 8/2015 | Oakley | B64C 25/52 244/17.23 |
| 2017/0152843 A1 | 6/2017 | Bei et al. | |
| 2019/0044424 A1 | 2/2019 | Sugaki et al. | |
| 2019/0081584 A1 | 3/2019 | Wamura | |
| 2019/0207543 A1 | 7/2019 | Lan et al. | |
| 2020/0317325 A1* | 10/2020 | Zhang | B64U 30/293 |

FOREIGN PATENT DOCUMENTS

| | | |
|---|---|---|
| EP | 2148422 A1 | 2/2012 |
| EP | 2281747 A2 | 5/2018 |
| JP | H07337080 A | 12/1995 |
| JP | H104694 A | 1/1998 |
| JP | 2002369573 A | 12/2002 |
| JP | 2009179321 A | 8/2009 |
| JP | 2019054635 A | 4/2019 |
| WO | 0176941 A2 | 10/2001 |
| WO | WO-2019119877 A1 * 6/2019 | ............. B64C 11/04 |

OTHER PUBLICATIONS

Franchi et al. "Adaptive closed-loop speed control of BLOC motors with applications to multi-rotor aerial vehicles." In: 2017 IEEE International Conference on Robotics and Automation (ICRA). Mar. 2, 2017 (Mar. 2, 2017) Retrieved on Feb. 1, 2021 (Feb. 1, 2021) from <https://hal.laas.fr/hal-01476812/document> entire document.

International Search Report and Written Opinion for PCT/US20/63611 mailed on Feb. 26, 2021.

* cited by examiner

SYSTEMS AND METHODS FOR STARTING A SENSORLESS MOTOR

CROSS-REFERENCE TO RELATED APPLICATIONS

This application is a 35 U.S.C § 371 National Stage Entry of International Application No. PCT/US2020/063611, filed Dec. 7, 2020, which claims priority to and the benefit of U.S. Provisional Patent Application No. 62/945,813, filed Dec. 9, 2019, the contents of all of which are hereby incorporated by reference herein for all purposes.

TECHNICAL FIELD

Embodiments relate generally to unmanned aerial vehicles (UAVs), and more particularly motors of a UAV.

BACKGROUND

Unmanned aerial vehicles (UAVs), such as a high altitude long endurance aircraft, are lightweight planes that are capable of controlled, sustained flight. UAVs may be associated with ground-based operators for two-way communications.

SUMMARY

An embodiment may include a system for starting a sensorless motor of an unmanned aerial vehicle (UAV) with an unknown rotation rate and direction. In one embodiment, the UAV is a high altitude long endurance solar-powered aircraft. The system may include an unmanned aerial vehicle (UAV); at least one sensorless motor of the UAV, the at least one sensorless motor comprising a set of windings and a rotor; at least one propeller connected to the at least one sensorless motor; a microcontroller in communication with the at least one sensorless motor, where the microcontroller may be configured to: determine a rotation rate of the at least one propeller; determine a rotation direction of the at least one propeller; provide an output to stop the at least one propeller if at least one of: the determined rotation rate is not a desired rotation rate and the determined rotation direction is not a desired rotation direction; and provide an output to start the at least one propeller if the at least one propeller is stopped at the desired rotation rate and the desired rotation direction.

In an additional system embodiment, the determined rotation rate may be based on a measured frequency of a back electromotive force (EMF) generated by at least one sensorless motor. In an additional system embodiment, the measured frequency of the back-EMF may be measured before the at least one sensorless motor is turned on. In an additional system embodiment, the measured frequency of the back-EMF may be proportional to the rotation rate of the at least one propeller. In an additional system embodiment, stopping the at least one propeller may further comprise energizing the at least one sensorless motor with current at a same frequency as the measured frequency of the back-EMF. In an additional system embodiment, the microcontroller may be further configured to: provide an output to continue rotation of the at least one propeller if the determined rotation rate is at the desired rotation rate and the determined rotation direction is at the desired rotation direction.

Additional system embodiments may include: a wing panel of the UAV, where the at least one sensorless motor may be attached to the wing panel; and at least one landing pod, where the wing panel may be supported by the at least one landing pod. In an additional system embodiment, the UAV may be a high altitude long endurance aircraft. In an additional system embodiment, the at least one sensorless motor may be a brushless AC motor.

A method embodiment may include: determining, by a microcontroller in communication with at least one sensorless motor connected to at least one propeller, a rotation rate of the at least one propeller; determining, by the microcontroller, a rotation direction of the at least one propeller; providing, by the microcontroller, an output to stop the at least one propeller if at least one of: the determined rotation rate is not a desired rotation rate and the determined rotation direction is not a desired rotation direction; and providing, by the microcontroller, an output to start the at least one propeller if the at least one propeller is stopped at the desired rotation rate and the desired rotation direction.

Additional method embodiments may include: providing, by the microcontroller, an output to continue rotation of the at least one propeller if the determined rotation rate is at the desired rotation rate and the determined rotation direction is at the desired rotation direction. In additional method embodiments, the determined rotation rate is based on a measured frequency of a back electromotive force (EMF) generated by at least one sensorless motor.

Another method embodiment may include: measuring, by a microcontroller in communication with at least one sensorless motor connected to at least one propeller, a rotation rate of the at least one propeller while the at least one sensorless motor is unpowered; determining, by the microcontroller, if the measured rotation rate is above a predetermined threshold; measuring, by the microcontroller, a rotation direction of the at least one propeller while the at least one sensorless motor is unpowered; determining, by the microcontroller, if the measured rotation direction is a desired rotation direction; and providing, by the microcontroller, an output to the at least one sensorless motor to bring the sensorless motor to a desired rotation rate and the desired rotation direction.

In additional method embodiments, the output comprises energizing the at least one sensorless motor with AC power matched in frequency to the measured rotation rate. In additional method embodiments, measuring the rotation rate and rotation direction further comprises: measuring, by the microcontroller, a voltage produced by windings of the at least one sensorless motor due to rotation of the rotor of the at least one sensorless motor while the at least one sensorless motor is unpowered. In additional method embodiments, providing the output further comprises: stopping, by the microcontroller, a rotation of the at least one sensorless motor if the measured rotation direction is not the desired rotation direction; starting, by the microcontroller, the rotation of the at least one sensorless motor in the desired rotation direction; and increasing, by the microcontroller, the rotation rate of the at least one sensorless motor to the desired rotation rate.

In additional method embodiments, providing the output further comprises: adjusting, by the microcontroller, the rotation rate of the at least one sensorless motor to the desired rotation rate if the measured rotation direction is the desired rotation direction. In additional method embodiments, the measured rotation rate is based on a measured frequency of a back electromotive force (EMF) generated by the at least one sensorless motor. In additional method embodiments, the measured rotation rate below the predetermined threshold allows for safe operation of the at least one sensorless motor. In additional method embodiments, the rotation direction is at least one of: clockwise and counterclockwise.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
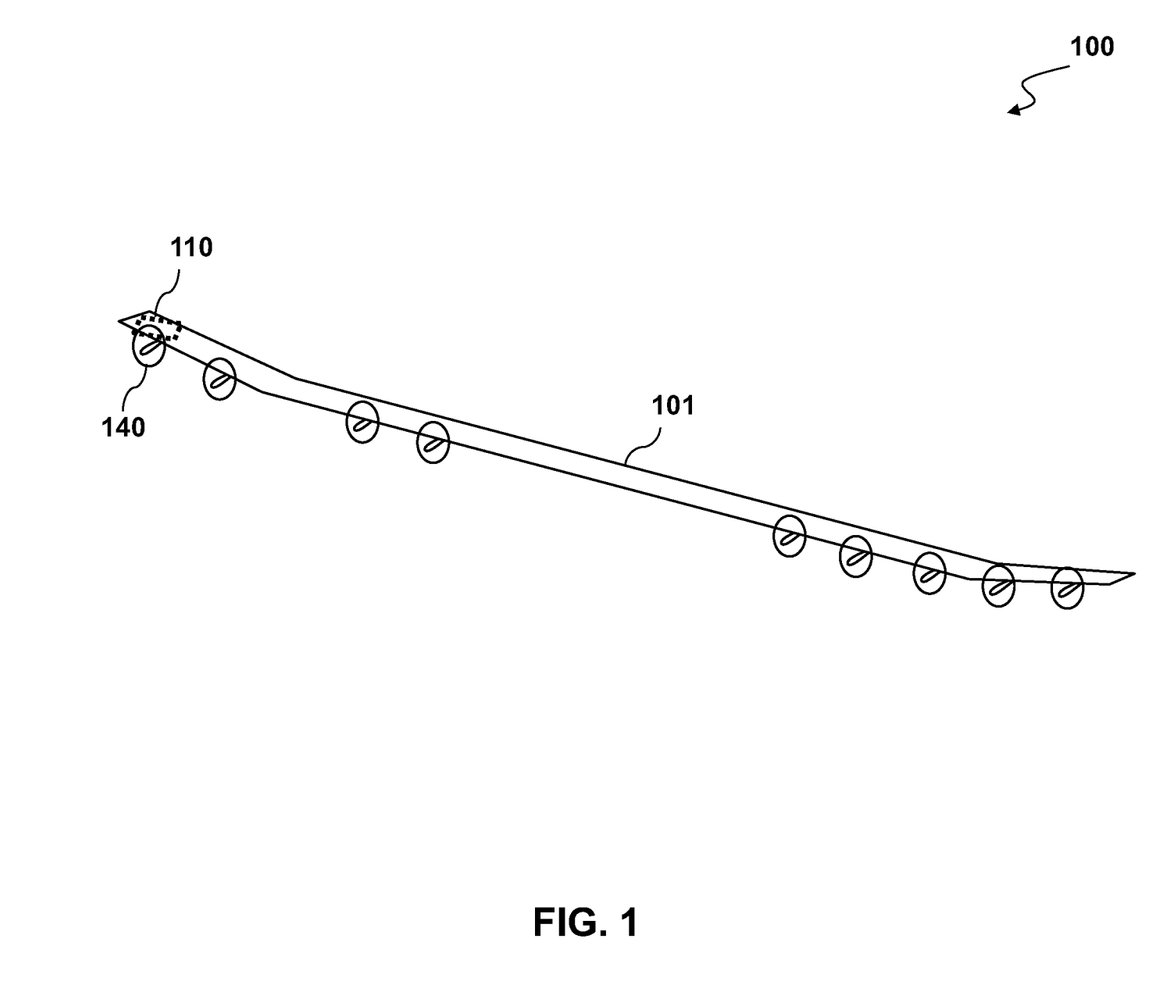
FIG. 1 depicts a system for starting a sensorless motor of an unmanned aerial vehicle with an unknown rotation rate and direction, according to one embodiment.

With respect to FIG. 1, a system 100 for starting a sensorless motor 110 of an unmanned aerial vehicle (UAV) with an unknown rotation rate and direction is depicted. UAVs are aircraft with no onboard pilot. UAVs may fly autonomously or remotely. Sensorless motors onboard a UAV may provide for decreased complexity of a UAV motor system, such as by requiring fewer interconnects between the driver module and the motor. In one embodiment, the UAV 101 is a high altitude long endurance aircraft. In one embodiment, the UAV 101 may have one or more motors 110, for example, between one and forty (40) motors, and a wingspan between one hundred (100) feet and four hundred (400) feet. In one embodiment, the UAV 101 has a wingspan of approximately two hundred sixty (260) feet and is propelled by a plurality of propellers 140 coupled to a plurality of motors, for example, ten (10) electric motors, powered by a solar array covering the surface of the wing, resulting in zero emissions. Flying at an altitude of approximately sixty-five thousand (65,000) feet above sea level and above the clouds, the UAV 101 is designed for continuous, extended missions of up to months without landing.

The UAV 101 functions optimally at high altitudes and is capable of considerable periods of sustained flight without recourse to land. In one embodiment, the UAV 101 may weigh approximately three thousand (3,000) lbs.

Figure 2:
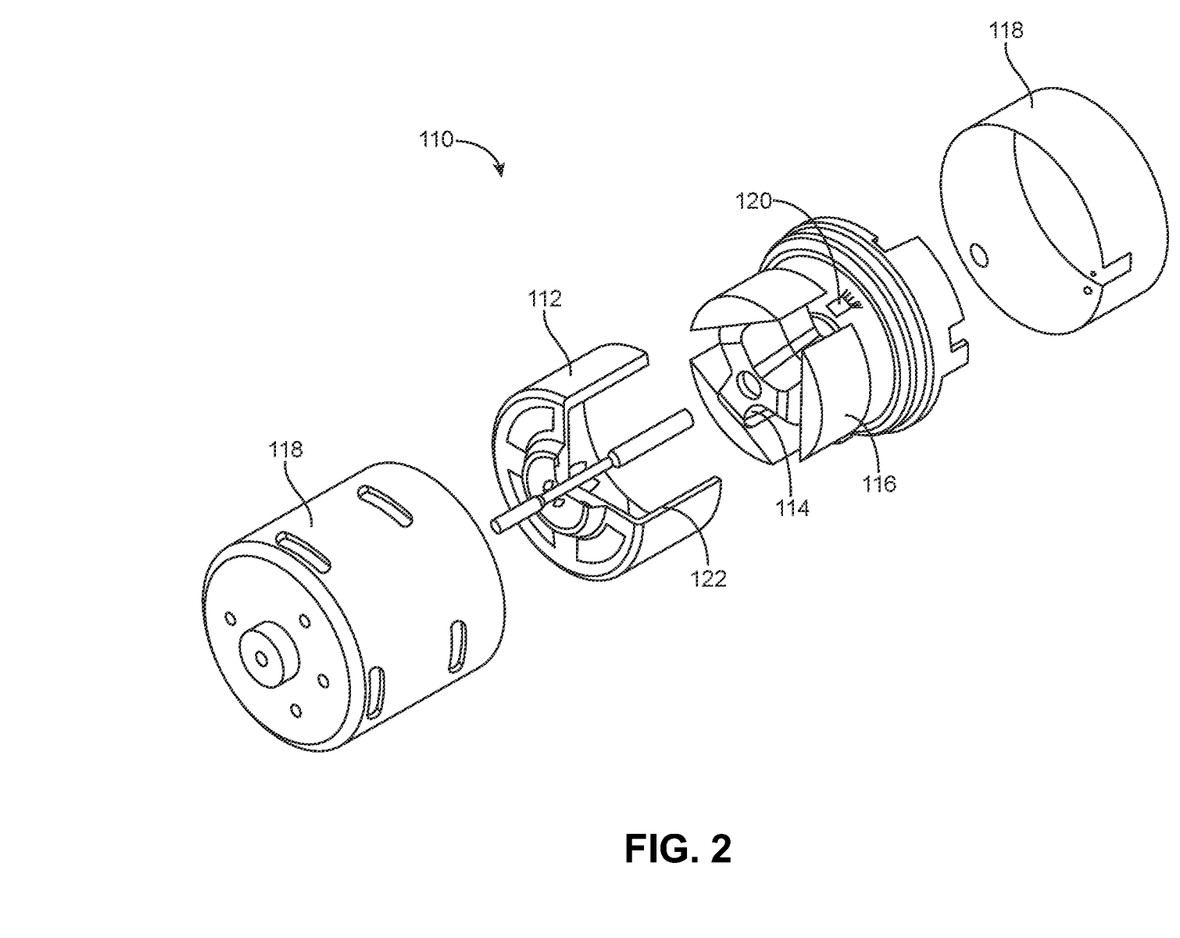
FIG. 2 depicts a perspective exploded view of the sensorless motor of FIG. 1.

With respect to FIG. 2, the at least one motor 110 is coupled to the UAV 101 for propulsion of the UAV 101. In one embodiment, the motor 110 is a brushless AC motor in an out-runner configuration. In another embodiment, the motor 110 is a brushless AC motor in a conventional configuration that includes an in-runner rotor 112 electrically connected with a wye-configuration winding 114 about improved armatures 116. The motor 110 may have a casing 118 formed of steel or other high-strength material to enclose and protect the motor.

A stator 120 is positioned around the perimeter of the rotor 112, with the stator 120 having a back iron to contain the magnetic field of the stator 120. The stator 120 may be formed of permanent magnets 122 such as neodymium and praseodymium or any suitable magnet, including electromagnets. The rotor 112 may have the armatures 116 built up from layers of laminated electrical steel, such as silicon steel, with an oxide film positioned between each steel layer, to reduce induced ring currents and to increase the efficiency of the motor 110. Other armature materials may include iron or amorphous steel.

In one embodiment, the motor 110 is configured to have the windings 114 wound around iron teeth. Additionally, there may be a layer of magnets on the outside of the motor 110 that may remain glued to the motor 110 down to approximately −80° Celsius. This is advantageous as the UAV 101 often flies at night and at high altitude with temperatures approaching −80° Celsius.

Some motors may be ironless to avoid hysteresis losses and eddy current losses, which result in energy being wasted in the form of heat. In one embodiment, the motor 110 may incorporate permendur: a cobalt-iron soft magnetic alloy with equal parts iron and cobalt, such as Hiperco®. Permendur has very low hysteresis and eddy current losses, often performing better than ironless motors. Still further, iron has some very important properties that are not found in ironless motors, including; (1) mechanically supporting the winding, (2) providing inductance, thus not requiring external inductors, (3) providing a way for heat to get out of the motor, (4) providing a very thin air gap so that far less magnetic material is needed to make the magnetic field, and (5) keeping the magnetic field out of copper, because a magnetic field going through copper causes lots of energy losses in copper.

A voltage applied across the motor's windings 114 forces the motor's rotor 112 to turn. The movement of the rotor 112 through the motor's magnetic field, however, is analogous to the behavior of a generator, and consequently, the motor not only receives an applied voltage but also generates its own voltage. This voltage is a back electromotive force (EMF), and the voltage is proportional to the motor's 110 rotational speed. More specifically, as the motor's windings 114 are turning inside the magnetic fields, a magnetic field induces a back EMF. This back EMF acts against the applied voltage that is causing the motor 110 to spin in the first place and reduces the current flowing through the coils of the motor 110. The back EMF may be used to determine a motor's rotor 112 speed and position and accordingly no sensors are required for making such determination. In one embodiment, the sensorless AC motor 110 is controlled using a microcontroller, such as microcontroller 150 described below.

The brushless AC motor 110 is similar to a generator such as one might find in a dynamo or turbine and so as it is driven around by a motor driver, it will also start to generate an electromagnetic force. The generated electromagnetic force then works against the forward voltage produced by the motor driver, but crucially the frequency of the force is directly related to the speed of the rotor 112 and can be measured by the microcontroller 150. By using this back-EMF frequency measurement it is therefore possible to measure the speed of the motor 110 and compare the measured speed to the speed that the microcontroller is trying to achieve.

The sensorless AC motor 110 may have permanent magnets 122 fixed on the rotor 112 with the electro-magnets mounted around the edge of the motor 110. As the motor 110 picks up speed the motor 110 starts to generate electromotive force in the stator windings 114. The frequency generated by the back-EMF is directly proportional to the speed of the motor 110. Therefore, the sensorless motor microcontroller 150 may read this frequency, determine the speed of the motor, and adjust the drive pattern accordingly.

In one embodiment, AC supplied to the stator windings 114 energizes the windings 114 to create a rotating magnetic flux. The flux generates a magnetic field in an air gap between the stator 120 and the rotor 112 and induces a voltage that produces a current through rotor bars. The rotor circuit may be shorted and current flows in rotor conductors. The action of the rotating flux and the current produces a force that generates a torque to start the motor 110.

The alternator rotor 112 may include a wire coil enveloped around an iron core. In one embodiment, the magnetic component of the rotor 112 is made from steel laminations to aid in stamping conductor slots to specific shapes and sizes. As currents travel through the wire coil, a magnetic field is created around the core—commonly referred to as field current. The field current strength controls the power level of the magnetic field.

The stator 120 may act as a field magnet, interacting with the armature 116 to create motion, or the stator 120 may act as the armature 116, receiving its influence from moving field coils on the rotor 112.

Figure 3:
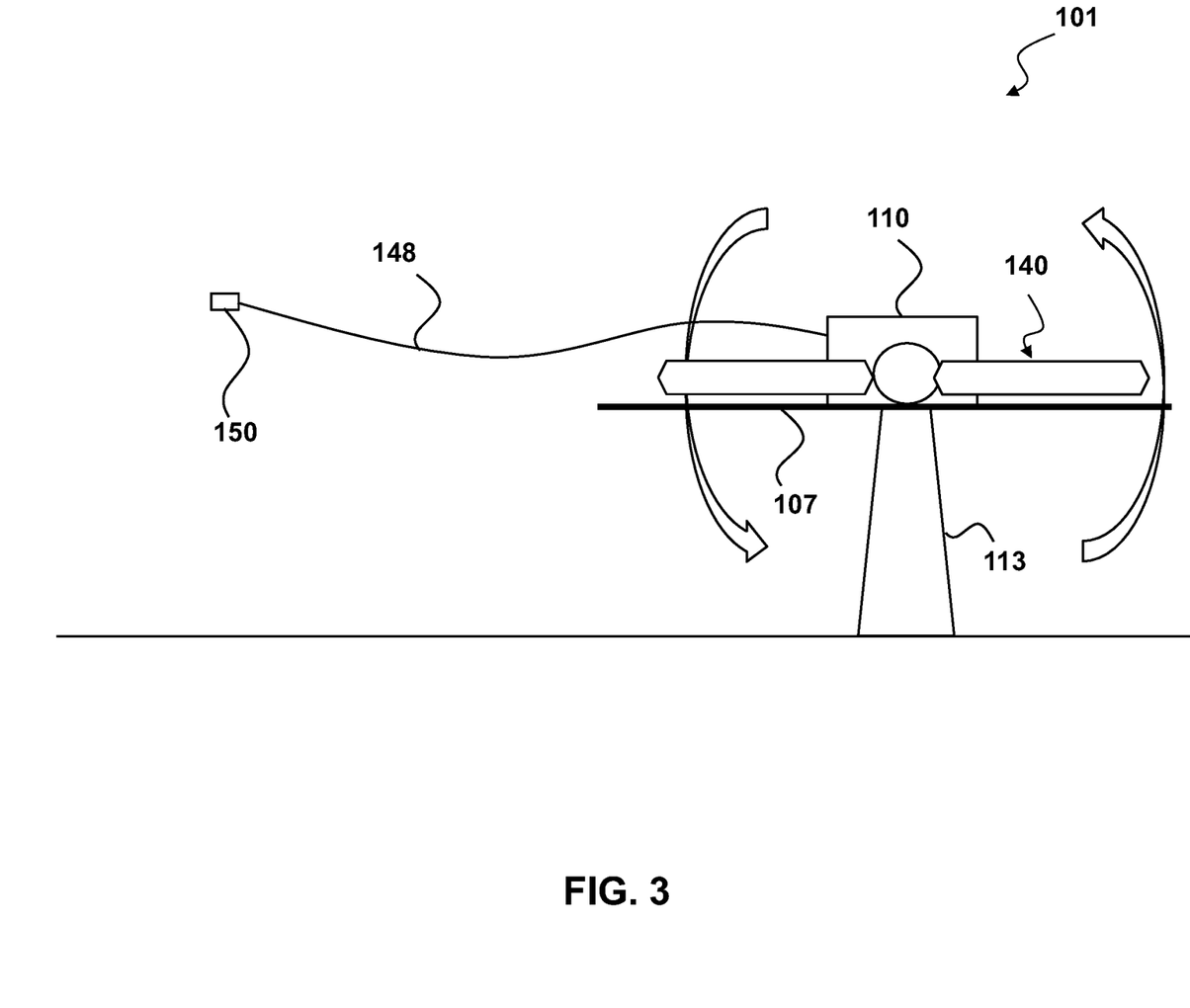
FIG. 3 depicts the sensorless motor of FIG. 2 coupled to a propeller.

With respect to FIG. 3, the at least one motor 110 is coupled to a propeller 140 of the UAV 101. The propeller 140 and the motor 110 may be integrated into a wing panel 107, and the wing panel may be supported by a landing pod 113. Other mounting arrangements of the motor 110 and propeller 140 are possible and contemplated. Generally speaking, the propeller 140 may be rotating in a non-desired direction and/or above a threshold rotation speed if the UAV 101, for instance, is on the ground and wind is coming from in front of or behind the UAV 101. For example, the propeller 140 may be rotating counterclockwise instead of clockwise when a clockwise direction is desired. The UAV 101 may not be able to start up because the propellers 140 are rotating above a threshold rotation speed or in the wrong direction. Therefore, it is desired to be able to start the motor 110 even if the propellers 140 are windmilling due to the wind approaching from in front of or behind the UAV 101.

Typically, DC power may be run on the windings 114 (see FIG. 2) and the motor 110 in order to bring the rotor 112 to a stop and to lock the rotor 112 in place. Microcontroller 150 may then slowly increase the motor 110 speed until the motor 110 is fast enough for sensorless operation. If the wind is strong enough, either from in front of or behind the UAV 101 when the UAV 101 is on the ground, the UAV 101 propellers 140 may provide sufficient speed and torque to prevent the DC current on windings 114 from stopping the rotor 112.

In one embodiment, the voltage produced by the windings 114 due to rotation of the rotor 112 may be measured before the motor 110 is turned on. More specifically, the windings 114 are not energized and there is no switching noise on the motor 110. Therefore, very low voltages, produced by very slow rotation rates, may be measured, and the rotation speed of the motor 110 may also be measured by microcontroller 150. In one embodiment, the motor 110 is energized with AC instead of DC at the same frequency as the rotation rate, and with the proper phase. For example, the microcontroller 150 may read the frequency, and the AC may lock the motor 110 to that frequency, bring the motor 110 to a stop, and then the motor 110 may be sped up in the right direction, thereby determining the speed of the motor 110 and adjust the drive pattern accordingly. The microcontroller 150 may transmit a signal via an output 148 to the propeller 140 to not rotate or to rotate in the proper direction. This may prevent the UAV 101 from stalling or spinning the propellers 140 above a threshold rotation speed or in the wrong direction.

Figure 4:
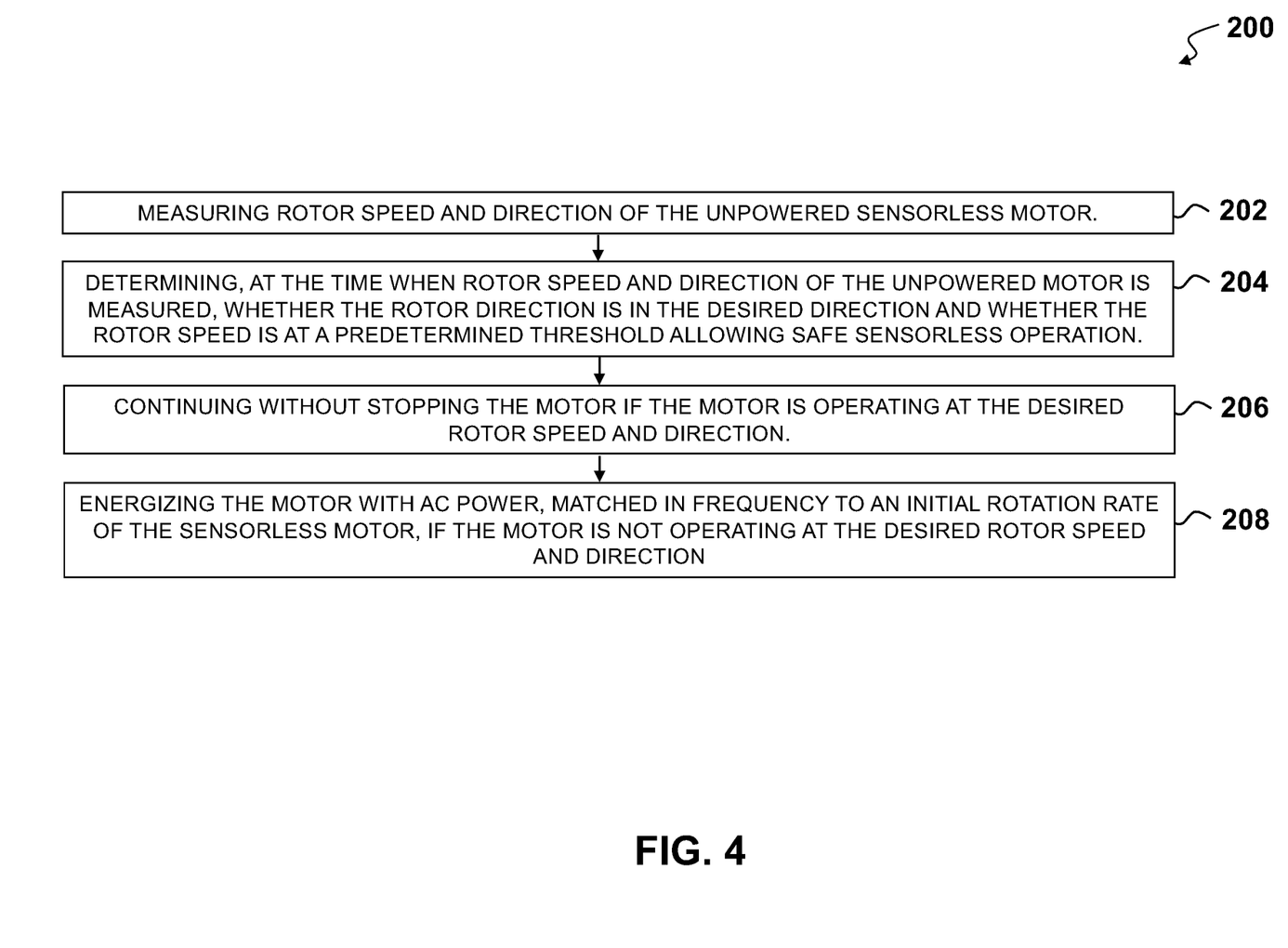
FIG. 4 depicts a flowchart of a process for starting a sensorless motor of the unmanned aerial vehicle of FIG. 1 with an unknown rotation rate and direction.

With respect to FIG. 4, a flowchart 200 illustrates a process for starting the sensorless motor 110 with an unknown rotation rate and direction. The method 200 includes measuring, by a microcontroller, the rotor speed and direction of the unpowered sensorless motor (step 202). The unpowered sensorless motor may be the sensorless motor 110 of FIGS. 2-3 before the motor is turned on. The method 200 may then include determining, by the microcontroller at the time when rotor speed and direction of the unpowered motor 110 is measured, whether the rotor direction is in the desired direction and whether the rotor speed is at a predetermined threshold allowing safe sensorless operation (step 204). If the motor 110 is operating at the desired rotor speed and direction, then the motor 110 may continue rotating without stopping (step 206). If the motor 110 is not operating at the desired rotor speed and direction, then the microcontroller 150 may energize the motor 110 with AC power, matched in frequency to an initial rotation rate of the motor 110, thereby bringing the sensorless motor and the at least one propeller to the desired operating speed and direction (step 208).

Figure 5:
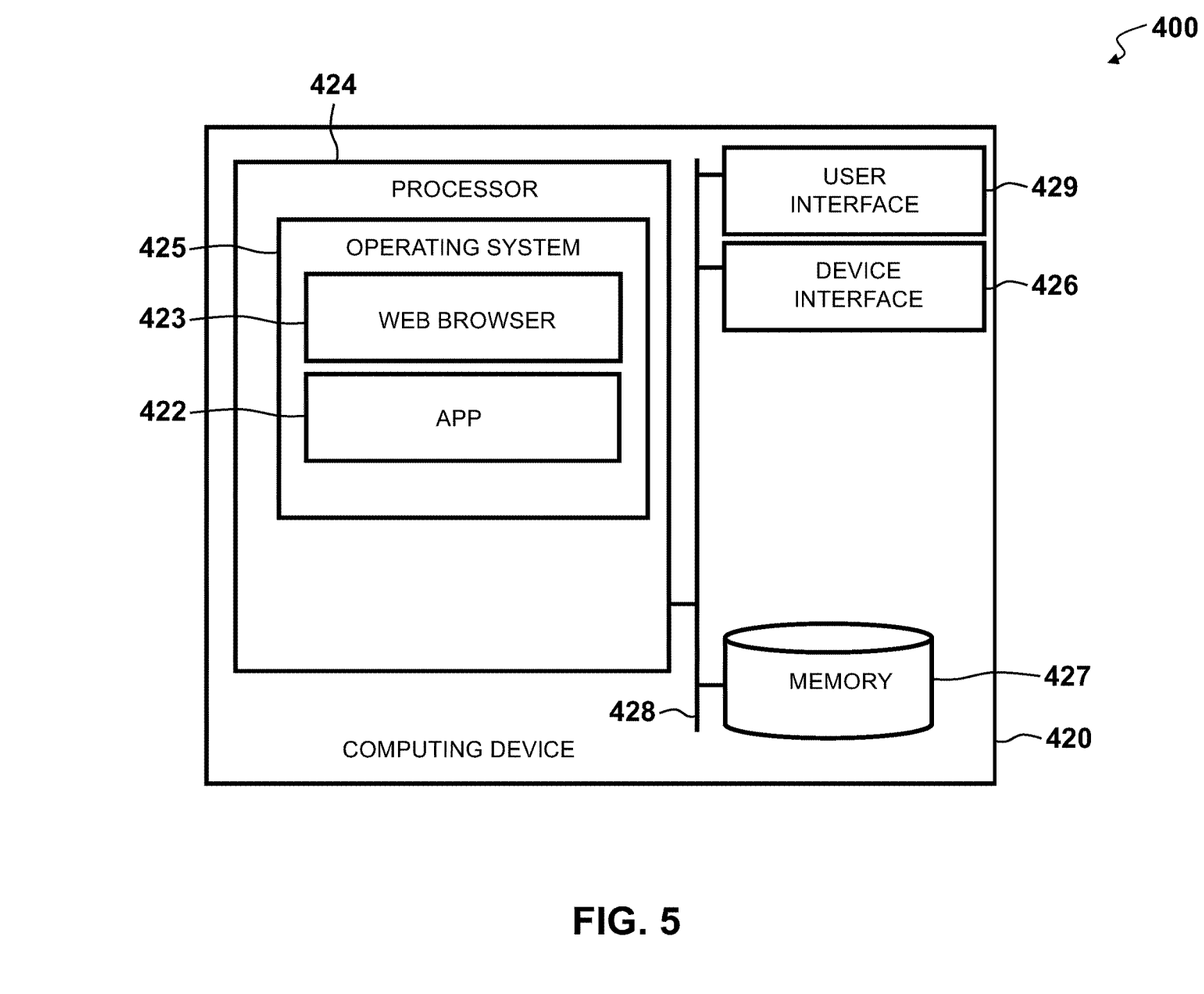
FIG. 5 illustrates an example top-level functional block diagram of a computing device embodiment.

FIG. 5 illustrates an example of a top-level functional block diagram of a computing device embodiment 400. The example operating environment is shown as a computing device 420, such as microcontroller 150 comprising a processor 424, such as a central processing unit (CPU), addressable memory 427, an external device interface 426, e.g., an optional universal serial bus port and related processing, and/or an Ethernet port and related processing, and an optional user interface 429, e.g., an array of status lights and one or more toggle switches, and/or a display, and/or a keyboard and/or a pointer-mouse system and/or a touch screen. Optionally, the addressable memory may include any type of computer-readable media that can store data accessible by the microcontroller 420, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 428. In some embodiments, via an operating system 425 such as one supporting a web browser 423 and applications 422, the processor 424 may be configured to execute steps of a process establishing a communication channel and processing according to the embodiments described above.

Figure 6:
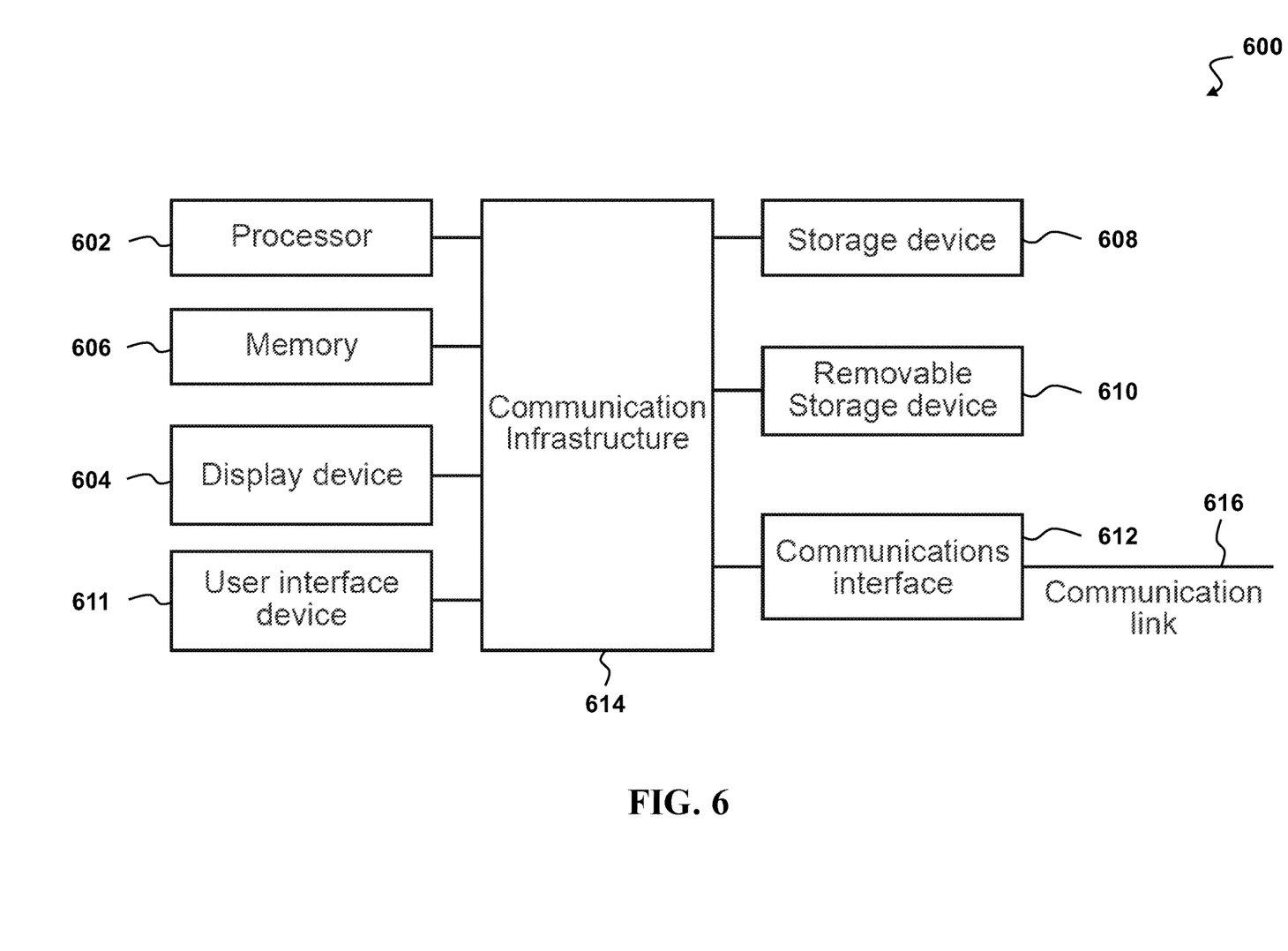
FIG. 6 shows a high-level block diagram and process of a computing system for implementing an embodiment of the system and process.

FIG. 6 is a high-level block diagram 600 showing a computing system comprising a computer system useful for implementing an embodiment of the system and process, disclosed herein. Embodiments of the system may be implemented in different computing environments. The computer system includes one or more processors 602, and can further include an electronic display device 604 (e.g., for displaying graphics, text, and other data), a main memory 606 (e.g., random access memory (RAM)), storage device 608, a removable storage device 610 (e.g., removable storage drive, a removable memory module, a magnetic tape drive, an optical disk drive, a computer readable medium having stored therein computer software and/or data), user interface device 611 (e.g., keyboard, touch screen, keypad, pointing device), and a communication interface 612 (e.g., modem, a network interface (such as an Ethernet card), a communications port, or a PCMCIA slot and card). The communication interface 612 allows software and data to be transferred between the computer system and external devices. The system further includes a communications infrastructure 614 (e.g., a communications bus, cross-over bar, or network) to which the aforementioned devices/modules are connected as shown.

Information transferred via communications interface 614 may be in the form of signals such as electronic, electromagnetic, optical, or other signals capable of being received by communications interface 614, via a communication link 616 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 612. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 7:
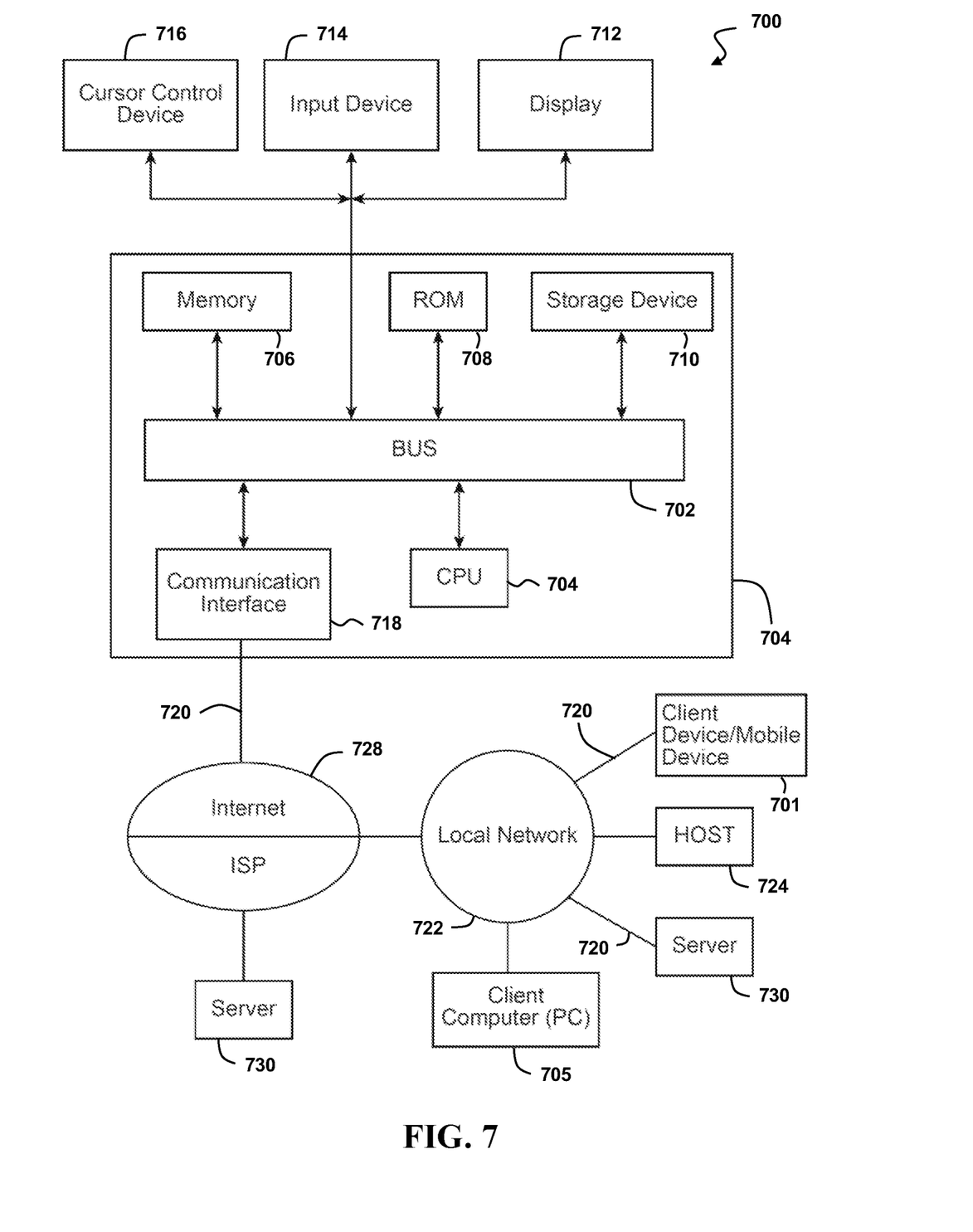
FIG. 7 shows a block diagram and process of an exemplary system in which an embodiment may be implemented.

FIG. 7 shows a block diagram of an example system 700 in which an embodiment may be implemented. The system 700 includes one or more client devices 701 such as consumer electronics devices, connected to one or more server computing systems 730. A server 730 includes a bus 702 or other communication mechanism for communicating information, and a processor (CPU) 704 coupled with the bus 702 for processing information. The server 730 also includes a main memory 706, such as a random access memory (RAM) or other dynamic storage device, coupled to the bus 702 for storing information and instructions to be executed by the processor 704. The main memory 706 also may be used for storing temporary variables or other intermediate information during execution or instructions to be executed by the processor 704. The server computer system 730 further includes a read only memory (ROM) 708 or other static storage device coupled to the bus 702 for storing static information and instructions for the processor 704. A storage device 710, such as a magnetic disk or optical disk, is provided and coupled to the bus 702 for storing information and instructions. The bus 702 may contain, for example, thirty-two address lines for addressing video memory or main memory 706. The bus 702 can also include, for example, a 32-bit data bus for transferring data between and among the components, such as the CPU 704, the main memory 706, video memory and the storage 710. Alternatively, multiplex data/address lines may be used instead of separate data and address lines.

The server 730 may be coupled via the bus 702 to a display 712 for displaying information to a computer user. An input device 714, including alphanumeric and other keys, is coupled to the bus 702 for communicating information and command selections to the processor 704. Another type or user input device comprises cursor control 716, such as a mouse, a trackball, or cursor direction keys for communicating direction information and command selections to the processor 704 and for controlling cursor movement on the display 712.

According to one embodiment, the functions are performed by the processor 704 executing one or more sequences of one or more instructions contained in the main memory 706. Such instructions may be read into the main memory 706 from another computer-readable medium, such as the storage device 710. Execution of the sequences of instructions contained in the main memory 706 causes the processor 704 to perform the process steps described herein. One or more processors in a multi-processing arrangement may also be employed to execute the sequences of instructions contained in the main memory 706. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 704 for execution. Such a medium may take many forms, including but not limited to, non-volatile media, volatile media, and transmission media. Non-volatile media includes, for example, optical or magnetic disks, such as the storage device 710. Volatile media includes dynamic memory, such as the main memory 706. Transmission media includes coaxial cables, copper wire and fiber optics, including the wires that comprise the bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 704 for execution. For example, the instructions may initially be carried on a magnetic disk of a remote computer. The remote computer can load the instructions into its dynamic memory and send the instructions over a telephone line using a modem. A modem local to the server 730 can receive the data on the telephone line and use an infrared transmitter to convert the data to an infrared signal. An infrared detector coupled to the bus 702 can receive the data carried in the infrared signal and place the data on the bus 702. The bus 702 carries the data to the main memory 706, from which the processor 704 retrieves and executes the instructions. The instructions received from the main memory 706 may optionally be stored on the storage device 710 either before or after execution by the processor 704.

The server 730 also includes a communication interface 718 coupled to the bus 702. The communication interface 718 provides a two-way data communication coupling to a network link 720 that is connected to the world wide packet data communication network now commonly referred to as the Internet 728. The Internet 728 uses electrical, electromagnetic or optical signals that carry digital data streams. The signals through the various networks and the signals on the network link 720 and through the communication interface 718, which carry the digital data to and from the server 730, are exemplary forms or carrier waves transporting the information.

In another embodiment of the server 730, interface 718 is connected to a network 722 via a communication link 720. For example, the communication interface 718 may be an integrated services digital network (ISDN) card or a modem to provide a data communication connection to a corresponding type of telephone line, which can comprise part of the network link 720. As another example, the communication interface 718 may be a local area network (LAN) card to provide a data communication connection to a compatible LAN. Wireless links may also be implemented. In any such implementation, the communication interface 718 sends and receives electrical electromagnetic or optical signals that carry digital data streams representing various types of information.

The network link 720 typically provides data communication through one or more networks to other data devices. For example, the network link 720 may provide a connection through the local network 722 to a host computer 724 or to data equipment operated by an Internet Service Provider (ISP). The ISP in turn provides data communication services through the Internet 728. The local network 722 and the Internet 728 both use electrical, electromagnetic or optical signals that carry digital data streams. The signals through the various networks and the signals on the network link 720 and through the communication interface 718, which carry the digital data to and from the server 730, are exemplary forms or carrier waves transporting the information.

The server 730 can send/receive messages and data, including e-mail, program code, through the network, the network link 720 and the communication interface 718. Further, the communication interface 718 can comprise a USB/Tuner and the network link 720 may be an antenna or cable for connecting the server 730 to a cable provider, satellite provider or other terrestrial transmission system for receiving messages, data and program code from another source.

The example versions of the embodiments described herein may be implemented as logical operations in a distributed processing system such as the system 700 including the servers 730. The logical operations of the embodiments may be implemented as a sequence of steps executing in the server 730, and as interconnected machine modules within the system 700. The implementation is a matter of choice and can depend on performance of the system 700 implementing the embodiments. As such, the logical operations constituting said example versions of the embodiments are referred to for e.g., as operations, steps or modules.

Similar to a server 730 described above, a client device 701 can include a processor, memory, storage device, display, input device and communication interface (e.g., e-mail interface) for connecting the client device to the Internet 728, the ISP, or LAN 722, for communication with the servers 730.

The system 700 can further include computers (e.g., personal computers, computing nodes) 705 operating in the same manner as client devices 701, wherein a user can utilize one or more computers 705 to manage data in the server 730.

Figure 8:
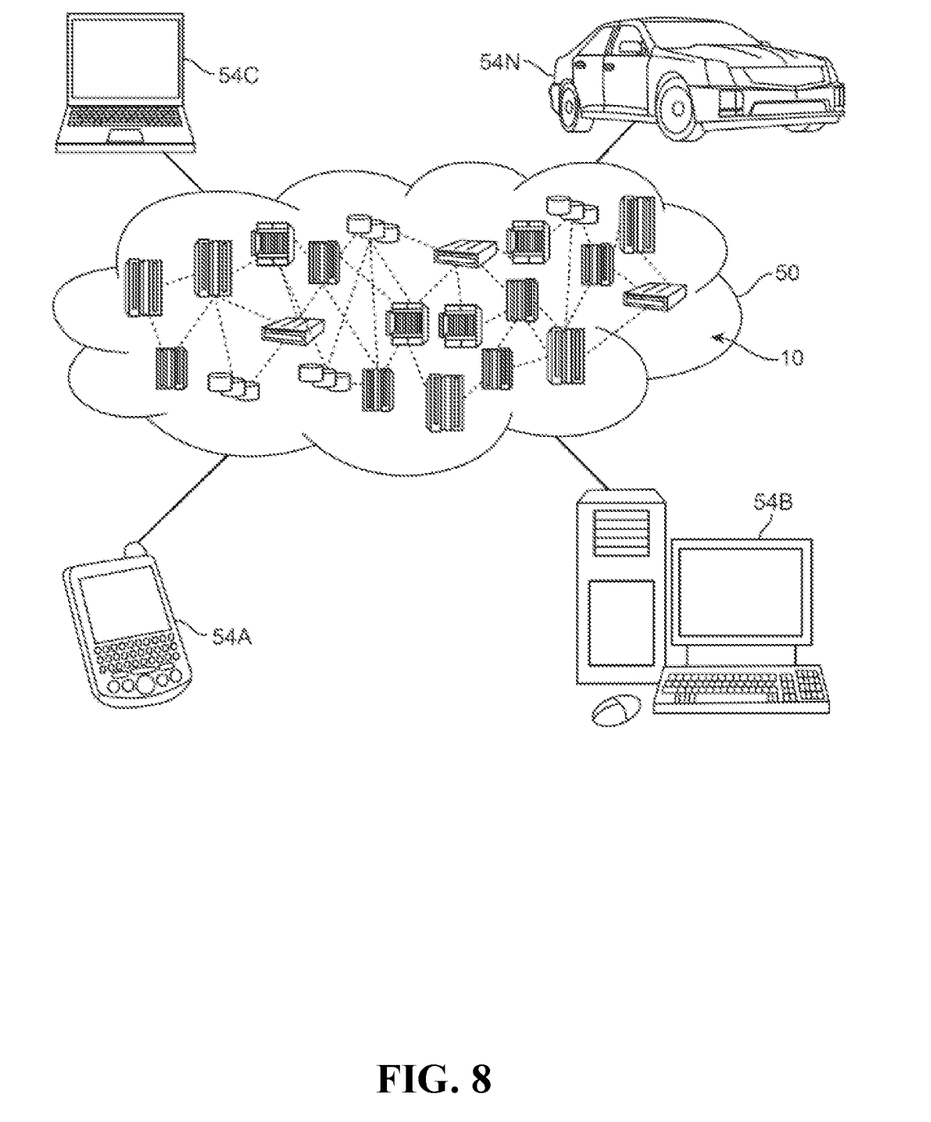
FIG. 8 depicts a cloud computing environment for implementing an embodiment of the system and process disclosed herein.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
an unmanned aerial vehicle (UAV);
at least one sensorless motor of the UAV, the at least one sensorless motor comprising a set of windings and a rotor;
at least one propeller connected to the at least one sensorless motor;
a microcontroller in communication with the at least one sensorless motor,
wherein the microcontroller is configured to:
determine a rotation rate of the at least one propeller;
determine a rotation direction of the at least one propeller;
provide an output to stop the at least one propeller if at least one of: the determined rotation rate is not a desired rotation rate and the determined rotation direction is not a desired rotation direction; and
provide an output to start the at least one propeller if the at least one propeller is stopped at the desired rotation rate and the desired rotation direction;
wherein the determined rotation rate is based on a measured frequency of a back electromotive force (EMF) generated by the at least one sensorless motor; and
wherein stopping the at least one propeller further comprises energizing the at least one sensorless motor with current at a same frequency as the measured frequency of the back-EMF.

2. The system of claim 1, wherein the measured frequency of the back-EMF is measured before the at least one sensorless motor is turned on.

3. The system of claim 1, wherein the measured frequency of the back-EMF is proportional to the rotation rate of the at least one propeller.

4. The system of claim 1, wherein the microcontroller is further configured to:
provide an output to continue rotation of the at least one propeller if the determined rotation rate is at the desired rotation rate and the determined rotation direction is at the desired rotation direction.

5. The system of claim 1, further comprising:
a wing panel of the UAV, wherein the at least one sensorless motor is attached to the wing panel; and
at least one landing pod, wherein the wing panel is supported by the at least one landing pod.

6. The system of claim 1, wherein the UAV is a high altitude long endurance aircraft.

7. The system of claim 1, wherein the at least one sensorless motor is a brushless AC motor.

8. A method comprising:
determining, by a microcontroller in communication with at least one sensorless motor connected to at least one propeller, a rotation rate of the at least one propeller;
determining, by the microcontroller, a rotation direction of the at least one propeller;
providing, by the microcontroller, an output to stop the at least one propeller if at least one of: the determined rotation rate is not a desired rotation rate and the determined rotation direction is not a desired rotation direction; and
providing, by the microcontroller, an output to start the at least one propeller if the at least one propeller is stopped at the desired rotation rate and the desired rotation direction, wherein the output comprises energizing the at least one sensorless motor with AC power matched in frequency to the measured rotation rate.

9. The method of claim 8, further comprising:
providing, by the microcontroller, an output to continue rotation of the at least one propeller if the determined rotation rate is at the desired rotation rate and the determined rotation direction is at the desired rotation direction.

10. The method of claim 8, wherein the determined rotation rate is based on a measured frequency of a back electromotive force (EMF) generated by at least one sensorless motor.

11. A method comprising:
measuring, by a microcontroller in communication with at least one sensorless motor connected to at least one propeller, a rotation rate of the at least one propeller while the at least one sensorless motor is unpowered;
determining, by the microcontroller, if the measured rotation rate is above a predetermined threshold;
measuring, by the microcontroller, a rotation direction of the at least one propeller while the at least one sensorless motor is unpowered;
determining, by the microcontroller, if the measured rotation direction is a desired rotation direction; and
providing, by the microcontroller, an output to the at least one sensorless motor to bring the sensorless motor to a desired rotation rate and the desired rotation direction, wherein the output comprises energizing the at least one sensorless motor with AC power matched in frequency to the measured rotation rate.

12. The method of claim 11, wherein measuring the rotation rate and rotation direction further comprises:
measuring, by the microcontroller, a voltage produced by windings of the at least one sensorless motor due to rotation of the rotor of the at least one sensorless motor while the at least one sensorless motor is unpowered.

13. The method of claim 11, wherein providing the output further comprises:
stopping, by the microcontroller, a rotation of the at least one sensorless motor if the measured rotation direction is not the desired rotation direction;
starting, by the microcontroller, the rotation of the at least one sensorless motor in the desired rotation direction; and
increasing, by the microcontroller, the rotation rate of the at least one sensorless motor to the desired rotation rate.

14. The method of claim 11, wherein providing the output further comprises:
adjusting, by the microcontroller, the rotation rate of the at least one sensorless motor to the desired rotation rate if the measured rotation direction is the desired rotation direction.

15. The method of claim 11, wherein the measured rotation rate is based on a measured frequency of a back electromotive force (EMF) generated by the at least one sensorless motor.

16. The method of claim 11, wherein the measured rotation rate below the predetermined threshold allows for safe operation of the at least one sensorless motor.

17. The method of claim 11, wherein the rotation direction is at least one of: clockwise and counterclockwise.

* * * * *